United States Patent [19]
Green et al.

[11] Patent Number: 5,681,055
[45] Date of Patent: Oct. 28, 1997

[54] SIDE-IMPACT AIRBAG MODULE ASSEMBLY INCORPORATING COMBINATION AIRBAG INFLATOR AND MODULE HOUSING

[75] Inventors: David J. Green, Brigham City; Donald R. Lauritzen, Hyrum; Donald J. Cunningham, North Ogden; J. Kirk Storey, Farmington; Brent K. Olson, Clearfield, all of Utah

[73] Assignee: Morton International, Inc., Chicago, Ill.

[21] Appl. No.: 726,431

[22] Filed: Oct. 4, 1996

Related U.S. Application Data

[63] Continuation-in-part of Ser. No. 535,643, Sep. 28, 1995, abandoned.

[51] Int. Cl.[6] .................................................. B60R 21/16
[52] U.S. Cl. ........................... 280/728.2; 280/730.2; 280/736
[58] Field of Search ........................... 280/728.2, 730.2, 280/732, 736, 740, 741, 730.1, 728.1

[56] References Cited

U.S. PATENT DOCUMENTS

| | | | |
|---|---|---|---|
| 5,263,739 | 11/1993 | Webber et al. | 280/728.2 |
| 5,344,182 | 9/1994 | Lauritzen et al. | 280/728.2 |
| 5,387,009 | 2/1995 | Lauritzen et al. | 280/732 |
| 5,407,223 | 4/1995 | Lauritzen et al. | 280/728.2 |
| 5,407,227 | 4/1995 | Lauritzen et al. | 280/732 |
| 5,435,596 | 7/1995 | Rose et al. | 280/728.2 |
| 5,441,705 | 8/1995 | Lauritzen et al. | 280/728.1 |
| 5,454,586 | 10/1995 | Rogerson | 280/728.2 |

Primary Examiner—Peter C. English
Attorney, Agent, or Firm—George W. Rauchfuss, Jr.; Gerald K. White

[57] ABSTRACT

A side impact airbag module assembly having a combination airbag inflator and module housing and an airbag cushion. The combination airbag inflator and module housing has an extruded unitary one-piece hollow elongated longitudinal body having an outer surface, an inner surface, a first open end, a second open end, and a plurality of gas exhaust ports extending from the inner surface to the outer surface. Two airbag receiving channels, each channel having a slot running along the channel, are respectively located on the outer surface of the longitudinal body, parallel with the body on opposite sides of the plurality of gas exhaust ports. A first endplug seals the first open end and a second endplug seals the second open end with the inner surface of the longitudinal body and the endplugs defining a gas generant chamber containing a gas generant. A first endplate is secured to the first open end of the longitudinal body and a second endplate is secured to the second open end, the endplates closing ends of the airbag receiving channels. Each endplate has a mounting bracket extending therefrom. The airbag cushion is folded and bundled in a tearable or breakable wrapper and has an open mouth partly formed by opposed mouth sides that are secured within the airbag receiving channels between the endplates. The endplates also retain opposed mouth ends of the airbag cushion.

9 Claims, 2 Drawing Sheets

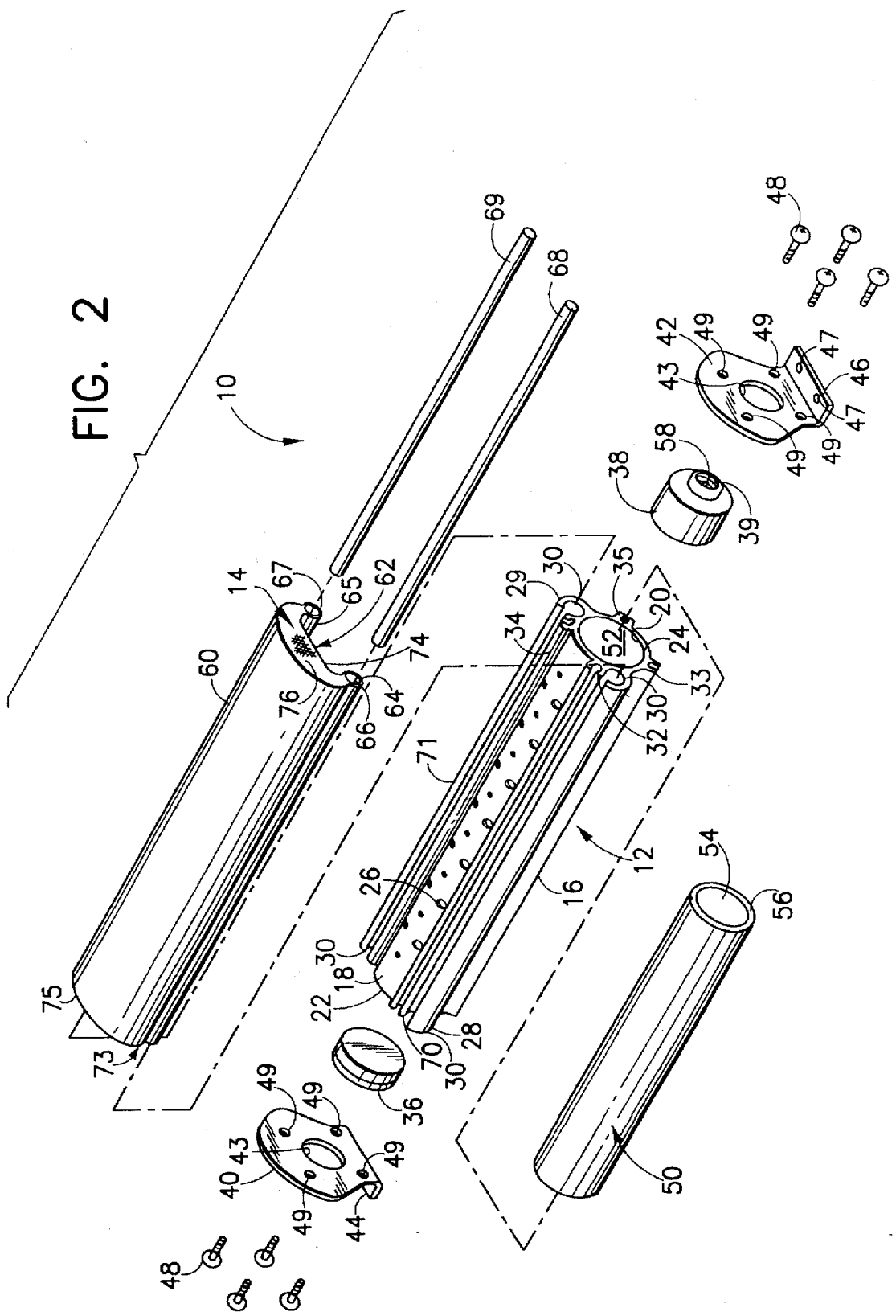

SIDE-IMPACT AIRBAG MODULE ASSEMBLY INCORPORATING COMBINATION AIRBAG INFLATOR AND MODULE HOUSING

RELATED APPLICATION

The present Application is a Continuation-In-Part of application Ser. No. 08/535,643 filed Sep. 28, 1995, now abandoned.

FIELD OF THE INVENTION

The present invention relates to an airbag module. More particularly, the present invention relates to a side-impact airbag module incorporating a combination airbag inflator and module housing and a soft-pack airbag cushion.

BACKGROUND OF THE INVENTION

Providing a relatively compact side-impact airbag module requiring fewer parts than previous airbag modules and that includes an airbag cushion attachment that does not produce point loading in the airbag cushion would be useful.

An airbag module is part of an inflatable restraint system that is employed in an automobile for protecting an occupant against injury by physically restraining the occupant's body when the automobile encounters a collision. As its name implies, a side impact airbag module protects an occupant against an impact to the side of the automobile and is normally positioned somewhere between the occupant and the side of the automobile closest to the occupant. Because the side-impact airbag module is mounted within the seat, on the exterior of the seat, on a side door or on a side pillar of the automobile, the size of a side-impact airbag module must be kept to a minimum.

The airbag module normally includes an airbag cushion and an inflator contained within a reaction canister. The inflator includes an inflator housing having gas exhaust ports and containing gas generant that, once triggered by a remote collision sensor, provides the inflation gas for inflating the airbag cushion. The airbag cushion has an open mouth and is secured to the canister adjacent the inflator so that the open mouth is positioned over the gas exhaust ports. The airbag cushion is secured using fasteners such as bolts, for example.

A typical airbag module has some drawbacks which may not make it suitable for use as a side-impact airbag module. First, using bolts as a bag retention method causes high stresses where the bag comes in contact with the fasteners, causing unwanted point loading on the bag. In addition, because the module includes a separate reaction canister and inflator housing, the module requires more parts and may be larger than preferred for a side-impact airbag module.

One prior art airbag module eliminates the need for airbag fasteners such as bolts or the like in order to reduce point loading on the airbags. U.S. Pat. No. 5,344,182 discloses a fastenerless airbag attachment system for use in a passenger side airbag module. A thickened gas inlet opening of the airbag is secured by a bead material within a channel portion of a cushion retainer which is secured in an attachment sleeve portion of a reaction housing. This slide-in method of attachment reduces or eliminates point loading on the airbag cushion as well as reducing parts, assembly time and making the module more conducive to automated assembly.

Other prior art airbag modules reduce the number of parts by combining components. U.S. Pat. No. 5,387,009 and U.S. Pat. No. 5,441,705 disclose passenger side airbag modules incorporating extruded, one-piece, inflator housing and reaction canisters. Also U.S. Pat. No. 5,407,227 discloses an extruded reaction canister having integral channels extending along its length that receive integral rails of an extruded inflator chamber to mate the reaction canister and inflator chamber. These airbag modules reduce parts, assembly time and are more conducive to automated assembly.

Providing a side-impact airbag module assembly of relatively compact size, requiring fewer parts, less assembly time, that is conducive to automated assembly, and has an airbag cushion attachment that reduces unwanted point loading in the airbag would be useful.

SUMMARY OF THE INVENTION

An object, therefore, of the present invention is to provide a side-impact airbag module having a relatively compact size. Another object of the present invention is to provide a side-impact airbag module requiring fewer parts. An additional object of the present invention is to provide a side-impact airbag module requiring less assembly time. A further object of the present invention is to provide a side impact airbag module that is more conducive to automated assembly. Yet another object of the present invention is to provide a side-impact airbag module having an airbag cushion attachment that reduces point loading in the airbag cushion.

In carrying out this invention, there is provided a combination airbag inflator and module housing that includes a unitary one-piece hollow elongated longitudinal body. The longitudinal body has an outer surface, an inner surface, a first open end, a second open end, a plurality of gas exhaust ports extending from the inner surface to the outer surface, and two airbag receiving channels parallel with the longitudinal body and located on the outer surface on opposite sides of the plurality of gas exhaust ports. A first endplug seals the first open end and a second endplug seals the second open end, the second endplug having an access opening. A first endplate is secured over the first open end of the longitudinal body and a second endplate is secured over the second open end and has an aperture located adjacent the access opening in the second endplug. The endplates close ends of the airbag receiving channels and each endplate has a mounting bracket extending therefrom.

According to one aspect of the present invention, the unitary one-piece elongated longitudinal body of the combination airbag inflator and module housing further includes a plurality of spaced-apart fastener receiving channels parallel with the longitudinal body and located on the outer surface. A plurality of fasteners engage the fastener receiving channels to secure the endplates to the longitudinal body. According to another aspect of the present invention, the unitary one-piece elongated longitudinal body is a one-piece extrusion.

According to an additional aspect of the present invention, the combination airbag inflator and module housing is incorporated in an airbag module assembly. The airbag module assembly further includes a gas generant contained within a gas generant chamber defined by the inner surface of the longitudinal body and the first and second endplugs, an ignitor connectable to a remote collision sensor and contained within the access opening in the second endplug for igniting the gas generant, and an airbag cushion. The airbag cushion is contained in a tearable or breakable wrapper and has an open mouth partly formed by opposed mouth sides that are secured within the airbag receiving channels between the endplates. The mouth is additionally formed by opposed mouth ends that are retained between the endplates and the opposing ends of the longitudinal body.

The present invention, therefore, provides a side-impact airbag module assembly that eliminates the need for a reaction canister for containing the airbag cushion. The airbag module assembly has a relatively compact size, requires fewer parts, less assembly time, is conducive to automated assembly, and has an airbag cushion attachment that reduces point loading in the airbag and helps eliminate flow of inflation gas around the airbag.

The invention together with further objects, features, advantages and aspects thereof, will be more clearly understood from the following description taken in connection with the accompanying drawings.

BRIEF DESCRIPTION OF THE DRAWINGS

FIG. 2 is an exploded perspective view of the airbag module of FIG. 1.

The same reference numerals refer to the same elements throughout the various figures.

DETAILED DESCRIPTION OF THE INVENTION

Figure 1:
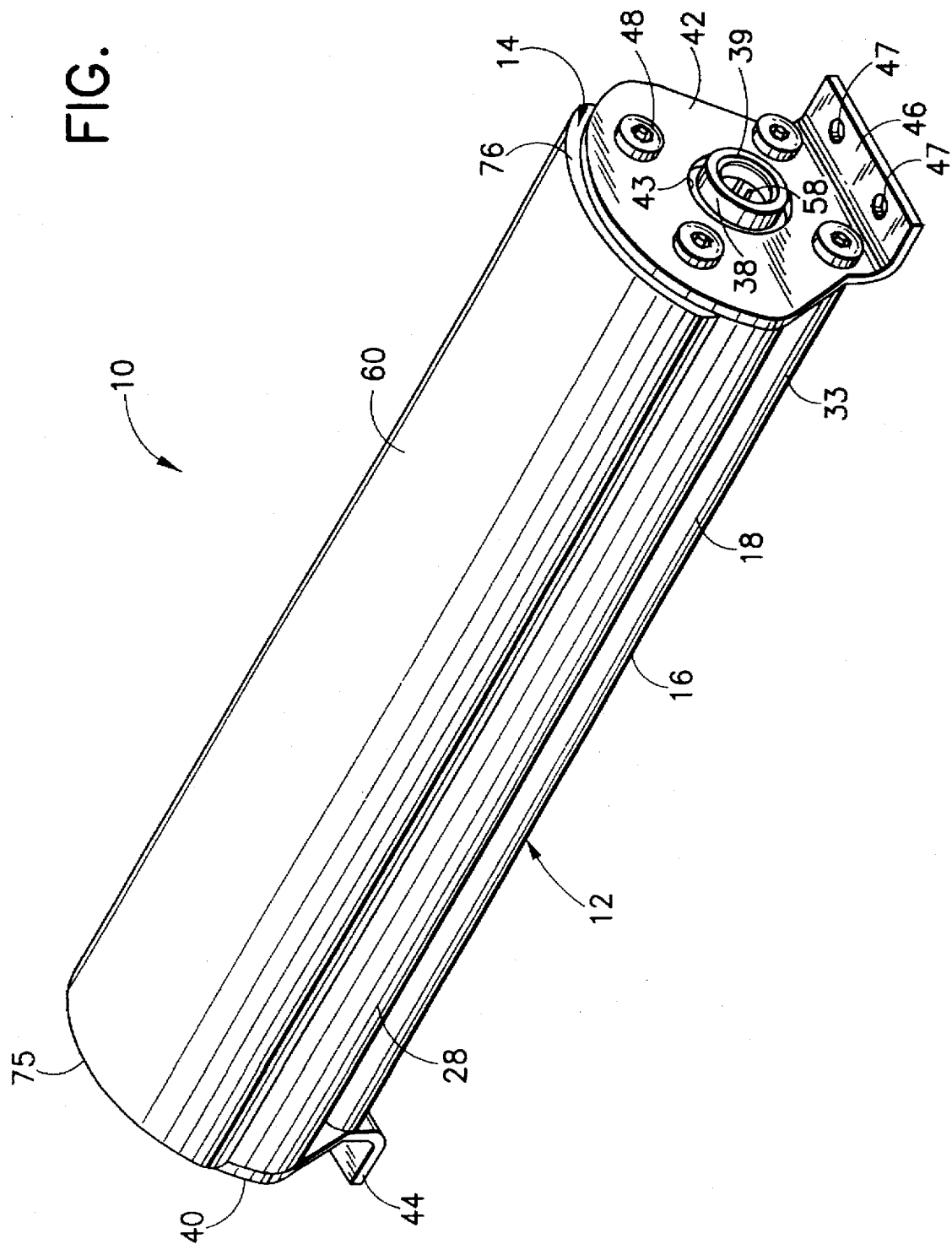
FIG. 1 is a perspective view of an airbag module according to the present invention.

Referring to FIGS. 1 and 2, the present invention is directed to a side-impact airbag module assembly, generally represented by the reference numeral 10, that substantially eliminates the need for a reaction canister. The airbag module assembly 10 comprises a combination airbag inflator and module housing, generally represented by the reference numeral 12, and an airbag cushion 14.

The combination airbag inflator and module housing 12 includes a unitary one-piece hollow elongated longitudinal body 16 having an outer surface 18, an inner surface 20, a first open end 22, a second open end 24, and a plurality of gas exhaust ports 26 extending from the inner surface 20 to the outer surface 18. The longitudinal body 16 also includes two airbag receiving channels 28,29 parallel with the longitudinal body 16 and located on the outer surface 18 on opposite sides of the plurality of gas exhaust ports 26. A plurality of spaced-apart fastener receiving channels 32,33, 34,35 are located on the outer surface 18 parallel with the longitudinal body 16.

It is important to note that the longitudinal body 16, airbag receiving channels 28,29 and fastener receiving channels 32,33,34,35 are joined as a single member which is preferably extruded and cut to the desired length. The material employed may be, for example, aluminum, and the body 16 is drilled or pierced to form the plurality of gas exhaust ports 26.

The combination airbag inflator and module housing 12 also includes a first endplug 36 sealing the first open end 22 and a second endplug 38 sealing the second open end 24, the second endplug 38 having an access opening 39. A first endplate 40 is secured over the first open end 22 of the longitudinal body 16 and the first endplug 36, and a second endplate 42 is secured over the second open end 24 and second endplug 38 and the second endplate 42 has an aperture 43 located adjacent the access opening 39 in the second endplug 38. (As shown, each endplate 40, 42 has an aperture 43 so that the endplates are interchangeable.) Each endplate 40,42 has an integral, generally unitary, mounting bracket 44,46 extending from a peripheral edge thereof for mounting the airbag module 10 within an automobile, and the mounting brackets 44,46 include mounting holes 47. A plurality of fasteners 48 extend through fastener receiving holes 49 in the endplates 40,42 to engage the fastener receiving channels 32,33,34,35, securing the endplates 40,42 to the longitudinal body 16. The endplates 40,42 retain the endplugs 36,38 within the open ends 22,24 of the longitudinal body 16, are generally circular and sized so that they close ends 30 of the airbag receiving channels 28,29.

The airbag module assembly 10 further includes a gas generant 50 contained within a gas generant chamber 52 defined by the inner surface 20 of the longitudinal body 16 and the first and second endplugs 36,38. The gas generant 50 or filter pack, which is known in the art, generally comprises a gas generant material or assembly 54 surrounded by a filter material 56 such as a screen mesh, for example. An ignitor or initiator 58 is contained within the access opening 39 in the second endplug 38, and is connectable to a remote collision sensor for igniting the gas generant 50.

The airbag cushion 14 is folded and bundled in a tearable or breakable wrapper 60 comprising a TYVEK fiber reinforced paper cover or plastic shrink wrap, and has an open mouth 62 partly formed by two opposed mouth sides 64,65. The two opposed mouth sides 64,65 of the airbag cushion 14 form airbag tubes 66,67 that are located within the airbag receiving channels 28,29 of the longitudinal body 16. A pair of airbag retainer rods 68,69 are located within the airbag tubes 66,67. The rods 68,69 are wider than slots 70,71 in the channels 28,29 so that the retainer rods 68,69 and airbag tubes 66,67 are secured within the channels 28,29. The rods 68,69 and airbag tubes 66,67 are also contained between the endplates 40,42 whereby the airbag cushion 14 is secured to the combination airbag inflator and module housing 12 with the open mouth 62 of the airbag cushion 14 positioned above the gas exhaust ports 26 on the longitudinal body 16. The present invention, therefore, provides a slide-in airbag cushion attachment. The open mouth 62 of the airbag cushion 14 is additionally formed by two opposed mouth ends 73,74 that are retained between the endplates 40,42 and the opposing ends 22,24 of the longitudinal body 16.

As shown in FIG. 1, the endplates 40,42 extend above the airbag receiving channels 28,29 to substantially cover opposed ends 75,76 of the folded and bundled airbag cushion 14 thus retaining the opposed mouth ends 73,74 between the endplates and the opposed ends 22,24 of the longitudinal body 16. This type of airbag cushion mounting and packing is referred to as a "soft pack" since the endplates 40,42, the wrapper 60 and the slide-in method of attaching the airbag cushion 14 to the combination airbag inflator and module housing 12 eliminate the need for a reaction canister normally used with an airbag module assembly, and substantially reduce the size of the airbag module assembly 10. In addition, this type of airbag mounting reduces parts, simplifies assembly and reduces or eliminates unwanted point loading in the airbag cushion 14.

The present invention, therefore, provides a side-impact airbag module assembly 10 having a relatively compact size, that requires fewer parts, less assembly time, is conducive to automated assembly, and has an airbag cushion attachment that reduces point loading in the airbag cushion 14.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A side-impact airbag module assembly comprising:

a combination side-impact airbag inflator and module housing having an internal gas generant chamber and comprising a unitary one-piece hollow elongated longitudinal body having an outer surface, an inner surface, opposing first and second open ends, a plurality of gas exhaust ports extending from the inner surface to the outer surface, and two airbag receiving channels parallel with the longitudinal body and located on the outer surface on opposite sides of the plurality of gas exhaust ports, each airbag receiving channel having a slot running along the channel;

a first endplug located within and sealing the first open end and a second endplug located within and sealing the second open end, the second endplug having an access opening;

gas generant located within the gas generant chamber;

an ignitor connectable to a remote collision sensor and located within the access opening for igniting the gas generant;

an inflatable airbag cushion having an open mouth partly formed by two opposing mouth sides, each of said two opposing mouth sides forming an airbag tube, an airbag retaining rod located within each airbag tube, and said airbag retaining rods being wider than the slots in the airbag receiving channels, each airbag tube and its retaining rod being located within one of the airbag receiving channels so that the open mouth of the airbag is located above the plurality of gas exhaust ports;

a first endplate secured over both the first open end of the longitudinal body and the first endplug and a second endplate secured over both the second open end and the second endplug, the second endplate having an aperture located adjacent the access opening in the second endplug, the first and second endplates secured to the opposing ends of the longitudinal body and closing ends of the airbag receiving channels to retain the retaining rods within the airbag receiving channels between the endplates, and each endplate having a mounting bracket extending therefrom, and said open mouth of the inflatable airbag cushion is additionally formed by two opposing mouth ends that are retained between the endplates and the opposing ends of the longitudinal body.

2. The side-impact airbag module assembly of claim 1 wherein each mounting bracket extends generally perpendicularly from a peripheral edge of the respective endplate.

3. The side-impact airbag module assembly of claim 2 wherein the unitary one-piece hollow elongated longitudinal body further includes a plurality of spaced-apart fastener receiving channels parallel with the longitudinal body and located on the outer surface, a plurality of fasteners engaging the fastener receiving channels to secure the endplates to the longitudinal body.

4. The side-impact airbag module assembly of claim 3 wherein the unitary one-piece elongated longitudinal body is a one-piece extrusion.

5. The side-impact airbag module assembly of claim 1 wherein the inflatable airbag cushion is folded and bundled in a tearable or breakable wrapper.

6. The airbag module assembly of claim 1 wherein the gas generant comprises a gas generant material surrounded by a filter material.

7. The side-impact airbag module assembly of claim 1 wherein the unitary one-piece elongated longitudinal body additionally includes a plurality of spaced-apart fastener receiving channels parallel with the longitudinal body and located on the outer surface, a plurality of fasteners engaging the fastener receiving channels to secure the endplates to the longitudinal body.

8. The airbag module assembly of claim 7 wherein the unitary one-piece elongated longitudinal body is a one-piece extrusion.

9. The airbag module assembly of claim 7 wherein the gas generant comprises a gas generant material surrounded by a filter material.

* * * * *